(12) United States Patent
Farashi et al.

(10) Patent No.: US 11,475,015 B2
(45) Date of Patent: *Oct. 18, 2022

(54) SYSTEMS AND METHOD FOR GENERATING SEARCH TERMS

(71) Applicant: COUPANG CORP., Seoul (KR)

(72) Inventors: Amir Reza Aghamousa Farashi, Seoul (KR); Andrei Alikov, Seoul (KR); Su Hwan Ahn, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/327,605

(22) Filed: May 21, 2021

(65) Prior Publication Data

US 2022/0164359 A1 May 26, 2022

Related U.S. Application Data

(63) Continuation of application No. 16/953,621, filed on Nov. 20, 2020, now Pat. No. 11,016,980.

(51) Int. Cl.
*G06F 16/2457* (2019.01)
*G06F 16/248* (2019.01)
*G06Q 30/06* (2012.01)

(52) U.S. Cl.
CPC ...... *G06F 16/24573* (2019.01); *G06F 16/248* (2019.01); *G06F 16/24575* (2019.01); *G06Q 30/0641* (2013.01)

(58) Field of Classification Search
CPC .......... G06F 16/24573; G06F 16/248; G06F 16/24575; G06Q 30/0641
See application file for complete search history.

(56) References Cited

U.S. PATENT DOCUMENTS

| 7,668,821 B1 | 2/2010 | Donsbach et al. |
| 8,572,069 B2 | 10/2013 | Ponte |

(Continued)

FOREIGN PATENT DOCUMENTS

| CN | 102456057 A | 5/2012 |
| CN | 102893280 A | 1/2013 |

(Continued)

OTHER PUBLICATIONS

International Search Report and Written Opinion in counterpart International Application No. PCT/IB2020/061285 dated Aug. 18, 2021 (7 pages).

(Continued)

*Primary Examiner* — Jorge A Casanova
(74) *Attorney, Agent, or Firm* — Finnegan, Henderson, Farabow, Garrett & Dunner LLP

(57) ABSTRACT

A method for generating keywords for searches, comprising the steps of retrieving search metric data comprising a plurality of search strings and interaction data; retrieving a plurality of first product identifiers each having one or more first attributes; generating, a table comprising the plurality of search strings ranked by interaction data; generating relevant lists comprising the plurality of search strings having interaction data above threshold values; retrieving data relating to a second product identifier; extracting one or more second attributes of the second product identifier; performing searches in the relevant lists using the second attribute data; assigning keywords to the data relating to the second identifier.

20 Claims, 11 Drawing Sheets

(56) References Cited

U.S. PATENT DOCUMENTS

| | | | |
|---|---|---|---|
| 8,688,673 | B2 | 4/2014 | Sarkar |
| 9,652,499 | B1 | 5/2017 | Smyros et al. |
| 10,438,266 | B1 | 10/2019 | Batra et al. |
| 10,628,403 | B2 | 4/2020 | Wu et al. |
| 11,016,980 | B1 | 5/2021 | Farashi et al. |
| 2009/0007271 | A1 | 1/2009 | Huang et al. |
| 2011/0119243 | A1 | 5/2011 | Diamond et al. |
| 2012/0023399 | A1 | 1/2012 | Hoshino et al. |
| 2013/0311485 | A1 | 11/2013 | Khan |
| 2015/0379571 | A1 | 12/2015 | Grbovic et al. |

FOREIGN PATENT DOCUMENTS

| | | |
|---|---|---|
| CN | 105469204 A | 4/2016 |
| CN | 105512226 A | 4/2016 |
| JP | 2007-323558 A | 12/2007 |
| JP | 2013-152744 A | 8/2013 |
| KR | 10-1828575 B1 | 2/2018 |
| TW | 202036264 A | 10/2020 |
| WO | WO 2008/096992 A1 | 8/2008 |
| WO | WO 2012/143839 A1 | 10/2012 |

OTHER PUBLICATIONS

Office Action dated Mar. 28, 2022, from corresponding Taiwanese Patent Application No. 110116457 (7 pages).
Office Action dated Apr. 12, 2022, from corresponding Korean Patent Application No. 10-2021-7020069 (6 pages).
Examination Notice in counterpart Hong Kong Patent Application No. 22021032435.0, dated Jun. 10, 2022 (3 pages).

401

| Searched Query | Products | Number of clicks |
|---|---|---|
| Nike shoes white | Product 11 | 865 |
| Nike shoes white | Product 435 | 34 |
| Samsung TV 50" | Product 34 | 652 |
| Sport shoes | Product 11 | 76 |

403

| Products | Keywords | Number of clicks |
|---|---|---|
| Product 11 | Nike shoes white, Sport shoes | 865, 76 |
| Product 34 | Samsung TV 50" | 652 |

| Rank | Products | Keywords | Number of clicks |
|---|---|---|---|
| 1 | Nike AIR MAX 97 triple white sneakers | Nike shoes white, Sport shoes | 865, 76 |
| 2 | Nike Phantom Football | Nike football | 139 |
| 3 | Nike Court Royal SL sneakers | Nike, Nike men, Nike shoes | 45, 3, 26 |
| 4 | Nike Air Max 270 White University | Nike sneakers, Air max, Nike | 345, 654, 67 |

FIG. 7

SYSTEMS AND METHOD FOR GENERATING SEARCH TERMS

CROSS-REFERENCE TO RELATED APPLICATIONS

This application is a continuation of and claims priority under 35 U.S.C. § 119 to U.S. patent application Ser. No. 16/953,621, filed on Nov. 20, 2020 (now allowed). The disclosures of the above-referenced application are expressly incorporated herein by reference.

TECHNICAL FIELD

The present disclosure generally relates to computerized systems and methods for generating machine searchable keywords. In particular, embodiments of the present disclosure relate to inventive and unconventional systems relate to generating machine searchable keywords for data entries stored in databases.

BACKGROUND

In the field of on-line retail business, information relating to a variety of products are stored in databases. When a shopper browses display interfaces of the on-line retail business, server systems retrieve this information from the databases for display to the shopper. It is typical for the shopper to conduct searches for products by providing to the server systems, search strings. The search strings may include terms relating to brand name, generic name, model name, number, color, year, category, or other attributes that the shopper may associate with a product. The server systems may look for entries in the databases corresponding to products that match one or more of the terms in the search strings. When matches are found, the entries of the corresponding matched products are return in a result list to be displayed to the shopper.

Thus, the quality of the results (i.e. relevancy of the results to the shopper's search) may largely depend on whether database entries of products contain sufficient relevant keywords such that the shopper's search string would likely result in correct matches. For example, a product having a database entry with few keywords are unlikely to be found in a shopper's search, even if it is highly relevant to the search.

Existing methods and systems rely on human individuals to provide such keywords in the database for the entries of the products. This is inefficient, and can be impractical if the number of database entries is large. Moreover, updates to the entries to add or remove keywords may be prohibitively costly if human interventions are required for each entry. Therefore, there is a need for improved methods and systems with to ensure that keywords are generated and updated automatically without human intervention.

SUMMARY

One aspect of the present disclosure is directed to a method for generating keywords for searches, comprising the steps of retrieving, from one or more database, search metric data for a predetermined time period, the search metric comprise at least a plurality of search strings, and interaction data corresponding to each of the plurality of search strings; retrieving, from the one or more database, a plurality of first product identifiers associated with the interaction data, the plurality of first product identifiers each having one or more first attributes; generating, based on the search metric data and the plurality of first product identifiers, a table, the table comprising the plurality of search strings ranked by the corresponding interaction data; generating one or more relevant lists, the relevant lists comprise the plurality of search strings having corresponding interaction data above one or more threshold values; retrieving, from the one or more data base, data relating to a second product identifier; extracting, from the data, one or more second attributes of the second product identifier; performing searches in the relevant lists using the one or more second attribute data; assigning, based on a predetermined rule, keywords to the data relating to the second identifier, the keywords being one or more of the plurality of search strings.

Another aspect of the present disclosure is directed to a computerized system for generating keywords for searches, comprising: one or more processors; storage media containing instructions to cause the one or more processors to execute the steps of: retrieving, from one or more database, search metric data for a predetermined time period, the search metric comprise at least a plurality of search strings, and interaction data corresponding to each of the plurality of search strings; retrieving, from the one or more database, a plurality of first product identifiers associated with the interaction data, the plurality of first product identifiers each having one or more first attributes; generating, based on the search metric data and the plurality of first product identifiers, a table, the table comprising the plurality of search strings ranked by the corresponding interaction data; generating one or more relevant lists, the relevant lists comprise the plurality of search strings having corresponding interaction data above one or more threshold values; retrieving, from the one or more data base, data relating to a second product identifier; extracting, from the data, one or more second attributes of the second product identifier; performing searches in the relevant lists using the one or more second attribute data; assigning, based on a predetermined rule, keywords to the data relating to the second identifier, the keywords being one or more of the plurality of search strings.

Yet another aspect of the present disclosure is directed to a system for generating keywords for searches, comprising; retrieving, from one or more database, search metric data for a predetermined time period, the search metric comprise at least a plurality of search strings, and interaction data corresponding to each of the plurality of search strings; retrieving, from the one or more database, a plurality of first product identifiers associated with the interaction data, the plurality of first product identifiers each having one or more first attributes; generating, based on the search metric data and the plurality of first product identifiers, a table, the table comprising the plurality of search strings ranked by the corresponding interaction data; generating one or more relevant lists, the relevant lists comprise the plurality of search strings having corresponding interaction data above one or more threshold values; receiving, from one or more user device, product information of a second product identifier comprising at least a product name; extracting, based on the product name, one or more second attributes data of the second product identifier; performing searches in the relevant lists using the one or more attribute data; assigning, based on a predetermined rule, keywords to the data relating to the second identifier, the keywords being one or more of the plurality of search strings.

Other systems, methods, and computer-readable media are also discussed herein.

BRIEF DESCRIPTION OF THE DRAWINGS

FIG. 7 depicts an illustration exemplary process for determining a probability of matching, consistent with the disclosed embodiments.

DETAILED DESCRIPTION

Figure 1A:
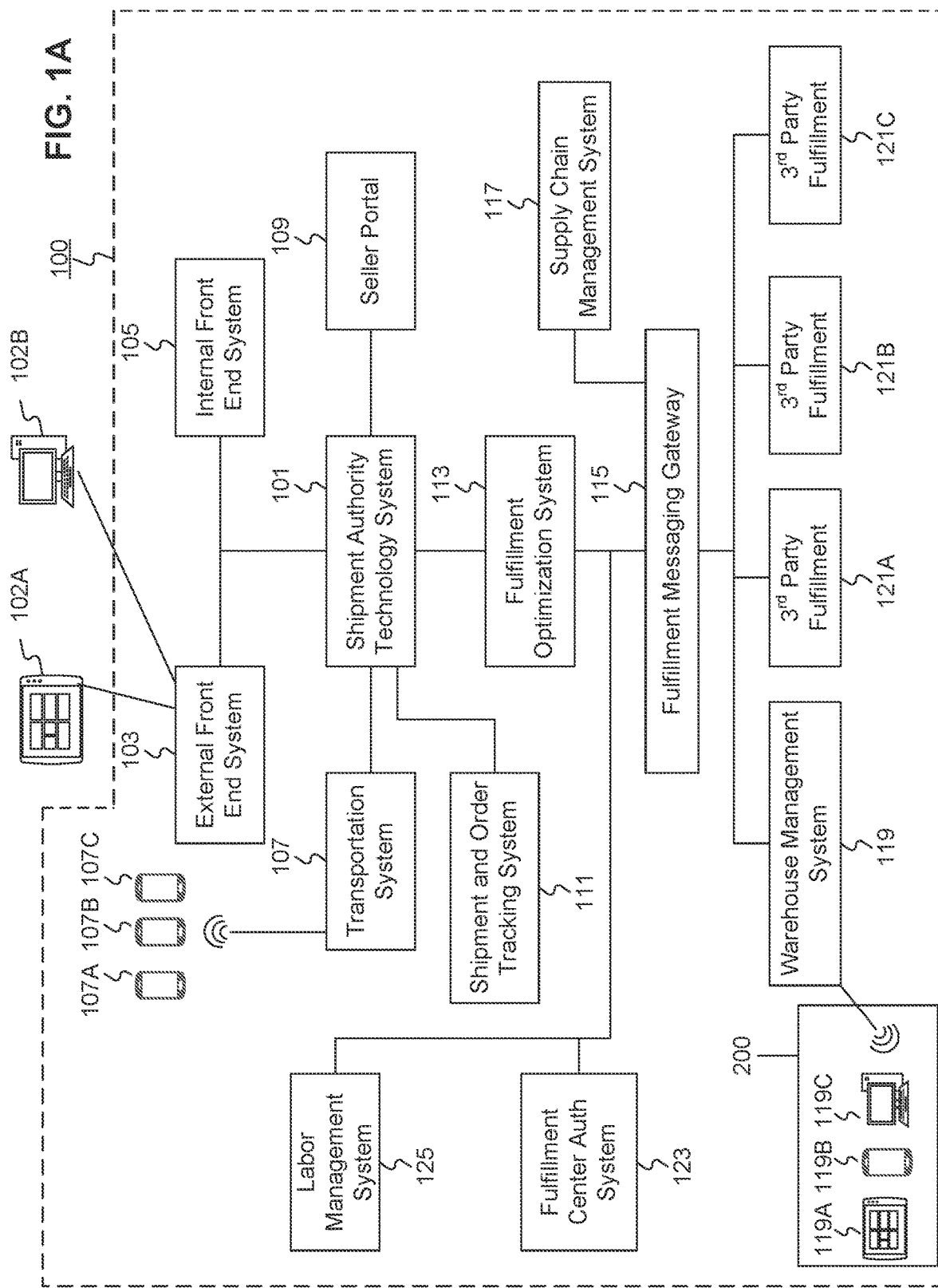
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Detail Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

According various embodiments of the present disclosure, there are provided unconventional computer implemented systems for generating searchable strings for entries in one or more databases. Whereas prior systems may obtain searchable strings from individuals or systems that generates these searchable strings or maintains the databases, the various embodiments of the present disclosure may rely on search queries supplied to the database systems to generate searchable strings for entries in the databases, thus greatly improving the quality and relevancy of search results presented to the searchers.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
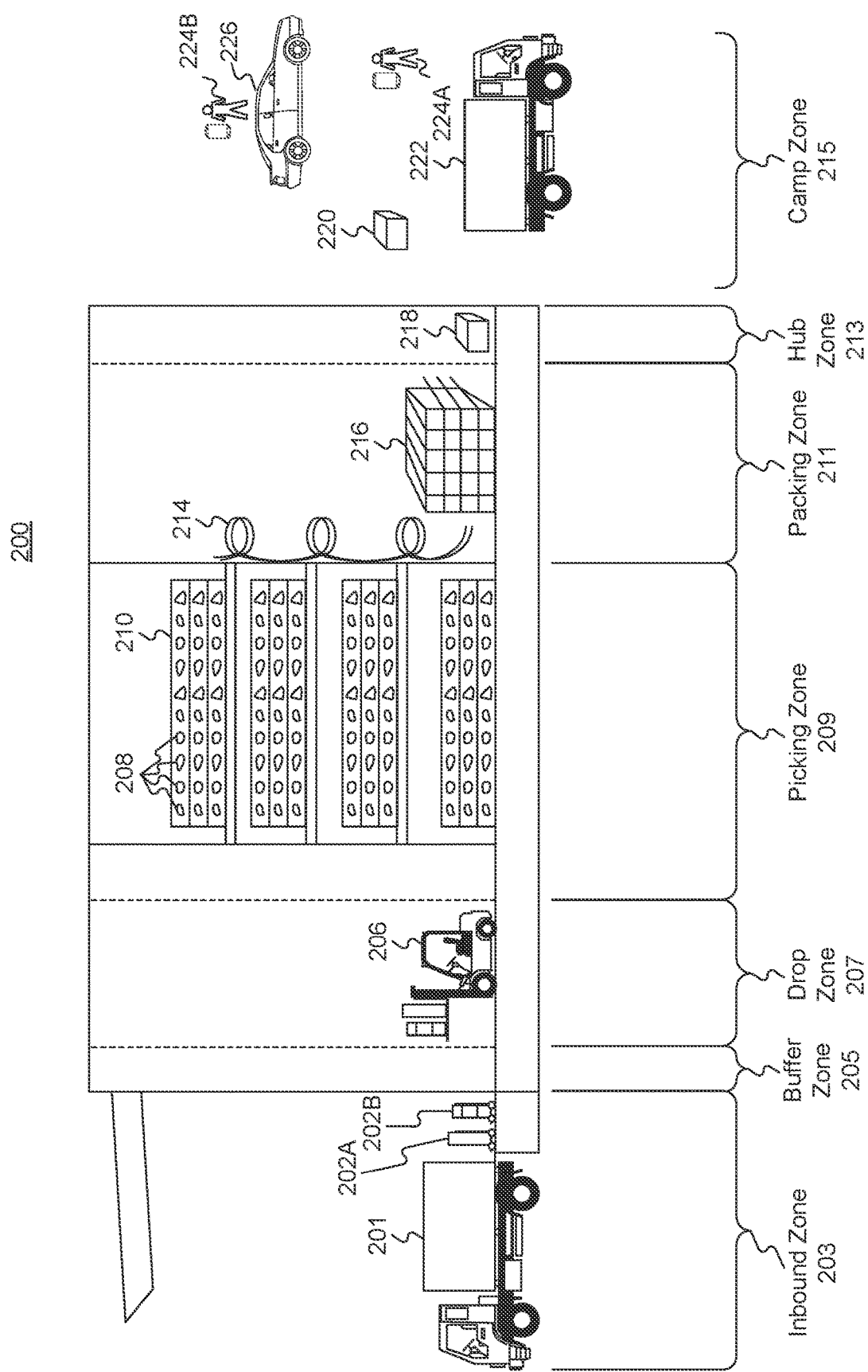
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC)

200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

From time to time, on-line retail platform systems ("the systems") may be updated with new product for sale. Shoppers may be unfamiliar with new products, and new products by their nature lack purchasing record and/or endorsements, and may thus be disadvantaged when competing against existing products in listings or search results. The systems may compensate for this by recommending new products ahead of existing products in listing and searches, or by presenting recommended new products in separate display regions. System 100 may be an example of the on-line retail platform systems.

However, such a recommendation process may rely on the systems being able to contextualize the new product through its properties, and match that to potential demand. This may be accomplished by keywords, tags, attributes, and other similar text searchable strings associated with the new product, such that the systems may compare the new product to the existing catalog of products, and recommend the new product when related an existing product is deemed to be relevant to a shopper's inquiry. However, conventional systems and methods largely leave the generations of these keywords, tags, attributes, and other similar text searchable strings to the sellers. This may be unreliable as many sellers may not be proficient at generating relevant terms for the new product. Moreover, this may be excessively burdensome if sellers register a large quantity of new products in the system.

According to some embodiments, there are provided methods for generating searchable keywords. Keywords, in context of computer technology, may refer to a series of data bits that represent characters such as letters, numbers, punctuations, and/or other similar information. In some embodiments, searchable keywords may be in the form of text strings. A keyword may be "searchable" if is capable to be used together with various different search functions. Searches, search operation or functions may refer to functions or steps performed by one or more logics, programs, and/or algorithms, executed by one or computer systems, for locating information or data. An example of a search operation may include: receiving one or more character strings (i.e., queries) representing target information or data that needs to be located; executing one or more logics, programs, or algorithms to located the target information or data; and if the target information or data is located, sending the located information or data back to the searcher. According to some embodiments, there are provided systems for generating searchable keywords, the systems include one or more processors and one or more memory storage media.

Figure 3:
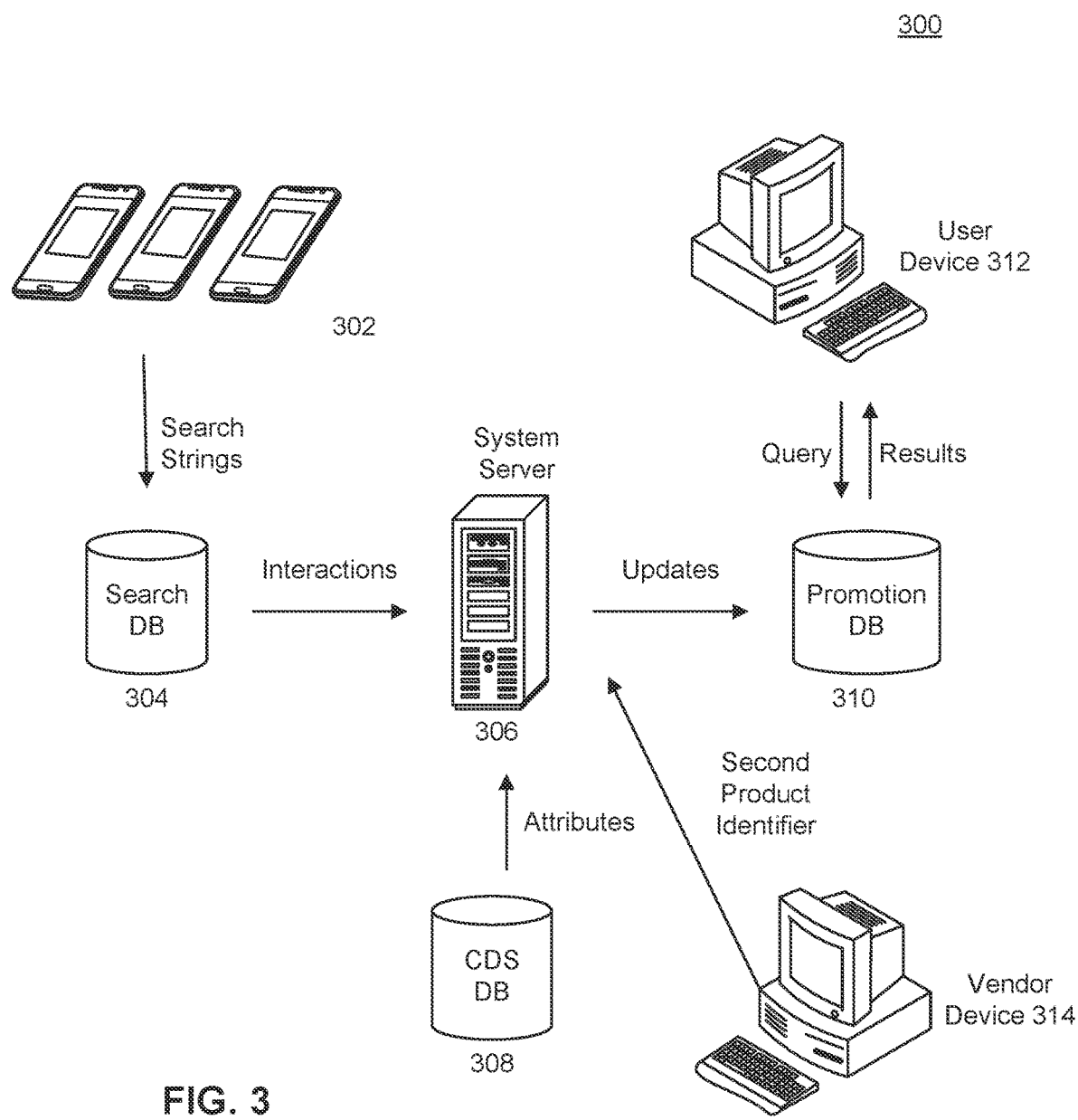
FIG. 3 is a diagrammatic illustration of an exemplary system for generating keywords for searches, consistent with the disclosed embodiments.

By way of example, FIG. 3 depicts diagrammatic illustration of an exemplary system for generating keywords for searches, consistent with the disclosed embodiments. System 300 may include devices 302. Devices 302 represent devices associates with users who searches through systems and databases over a period of time. For example, users may use devices 302 to search for products using search strings in system 100 and any associated databases. These searches generate search metric data, such as the search strings used, the results generated, and the interaction between the users and the results. The search metric data may be stored in search DB 304. Users associated with devices 302 will hereafter be referred to as "searcher" to distinguish from users associated with user device 312 or vendor device 314.

Server 306 may be a computing device including one or more processors, I/O sections, and memory storage media. Server 306 may retrieve, as inputs, data from entries in a first database, such as search database (Search DB) 304 and/or common data storage database (CDS DB) 308, and may provide as output, processed data for storage in a second database, such as promotion DB 310. In some embodiments, data retrieved from search DB 304 may be search metric data including searching strings, interaction data, and first product identifiers associated with the search strings. In some embodiments, server 306 receives attributes corresponding to the first product identifiers from CDS DB 308. Server 306 may generate tables using the interaction data and the attributes. Using the generated tables, server 306 may generate keywords and assign the keywords to second product identifier received from vendor device 314. In some embodiments, server 306 may provide to promotion DB 310 the second product identifier having the assigned keywords.

Vendor device 314 may be a computing device that uploads data to a system, such as server 306. In some embodiments, user devices 102A-C may be examples of vendor device 314, and external front end system 103 may interact with user devices 102A-C to configure the uploaded data for processing. In some embodiments, vendor device 314 may be associated with a vendor who is the source of the product (e.g., a manufacturer or reseller) for sale on system 100. For example, the vendor who provide a product for sale on system 100 may provide (e.g., upload) data of the product, including, e.g., product name, color, brand, category, other attributes (e.g. size, dimension, color, battery life), images, and/or other features and options that inform potential buyers of the product's nature and use.

User device 312 may be a computing device associated with users who may be interacting with system 100 as shoppers. User devices 102A-C may be examples of user device 312. In some embodiments, shoppers using user device 312 may perform searches for products. In some embodiments, user device 312 may interact with front end system 103 to perform searches in system 100. Along with the results of the search, external front end system 103 may retrieve results from promotion DB 310 for display on user device 312.

Figure 4:
FIG. 4 is a diagrammatic illustration of examples of data or information associated with a first product identifier in table, consistent with the disclosed embodiments.

FIG. 4 is a diagrammatic illustration of examples of data or information associated with first product identifiers in table, consistent with the disclosed embodiments. The table may be generated using process 500 depicted in FIG. 5. Table 401 depicts an interaction table generated by server 306. Column 402 includes search strings from devices 302. In the simplified example of FIG. 4, devices 302 may have received search strings "Nike shoes white", "Samsung TV 50"," and "Sport shoes." Column 404 represents first product identifiers that were selected by searchers for each of search strings in column 402, and column 406 represents a frequency of selection (e.g. clicks, selections) for the corresponding first product identifier in column 404. For example, searchers selected product 11 for "Nike shoes white" 865 times; selected product 435 for "Nike shoes white" 34 times; selected product 11 for "Sport shoes" 76 times; and selected product 34 for "Samsung TV 50"" 652 times.

Table 403 depicts a relevant list generated by server 306 based on table 401, consistent with the disclosed embodiments. The relevant list may include first product identifiers from table 401, and for each of these first product identifiers. As depicted in FIG. 4, column 408 represent the first product identifiers, column 410 represents the search strings associated with the first product identifiers of column 408, and column 412 represents the frequency of each of the corresponding searching in column 410. For example, based on table 401, column 408 contain product 11 and product 34. For product 34, recall in table 401, searchers selected it for "Nike shoes white" 865 times, and for "Sport shoes" 76 times, and thus column 410 and 412 includes this information. The process of generating table 403 from table 401 will be described below with respect to FIG. 5.

Figure 5:
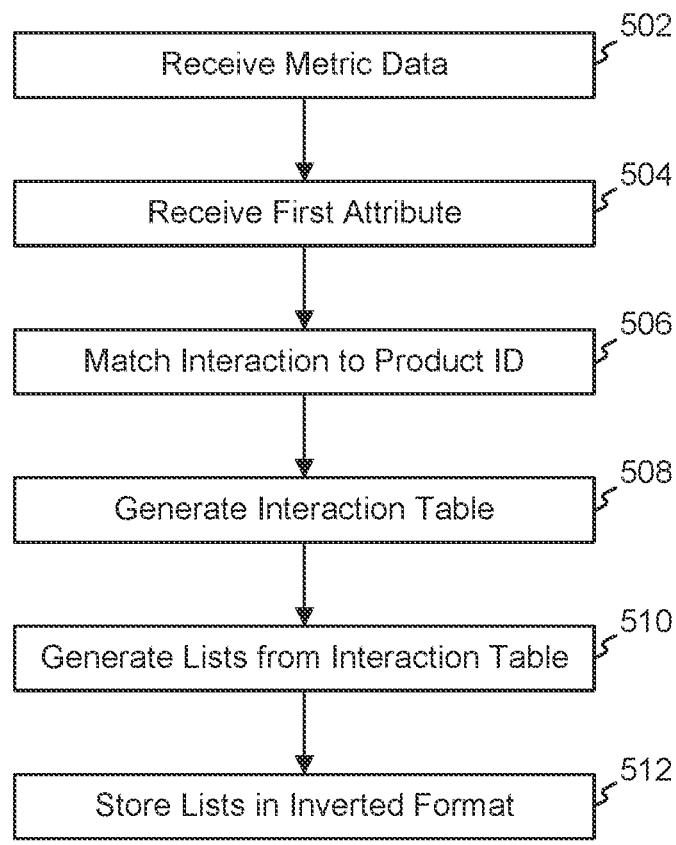
FIG. 5 is a flow chart depicting an exemplary process for generating keywords for searches, consistent with the disclosed embodiments.

FIG. 5 is a flow chart 500 depicting an exemplary process for generating keywords for searches, consistent with the disclosed embodiments.

According to some embodiments, the systems may retrieve, from one or more databases, search metric data for a predetermined time period. Search metric data may refer to data that is generated or gathered from search operations. Examples of search metrics may include, but not limited to, number of search queries received, the character strings of each queries, number of searches performed, system errors, the time/speed of the searches, the results of the searches, interactions with the search results, and/or other data cataloging the operations of the searching algorithms and systems. Once generated, the search metric data may be stored in databases (e.g., search DB 304). For example, searchers may use devices 302 to conduct searches for products in system 100. System 100, or one of its sub-system (e.g. external front system 103), may generate search metric data based on those searches over a period of time for storage in search DB 304.

In step 502, server 306 receives search metric data from search DB 304.

In some embodiments, the search metric data include at least a plurality of search strings, and interaction data corresponding to each of the plurality of search strings. Search strings, as used herein, refer to character strings defining the subject matter of search operations. For example, search string may include terms such names of products whose data may be stored in databases, thus the data of a product may be located based on its name. Other examples of terms that may be part of a search string include brand, nickname, attributes, serial numbers, tags, keywords, or other identifiers or properties associated with data of the products stored as entries in one or more databases (e.g. search DB 304).

In some embodiments, the plurality of search strings are text strings provided from user devices. For example, the characters in the search strings may be text characters, and may correspond to examples of terms above. User devices may refer to devices, such as PC computers, mobile phones, laptops, tablets, or other similar computing and communication devices associated with users. Users, as used herein, refer to individuals who use the systems described in the disclosed embodiments, but who are not part of on-line retail platform. Examples of users may include vendors, sellers, shoppers, browsers, or any other individual that may perform search operations using the systems. By way examples, various searchers using devices 302 may provide search strings as they search for data stored in system 100.

Interaction data, as used herein, may refer to metric data that describe any interaction between the searchers and the systems and databases. For example, interaction data may include data such as, what strings are used, how often are searches performed, and interactions between the searchers and the results generated. In some embodiments, the interaction data may include a number of user interaction with search results of each of the plurality of search strings. For example, user interactions with search result may provide an indication how searchers respond to the result provided in response to queries of search strings, and may be useful for the systems to identify the most relevant results. Examples of user interaction may include accessing, viewing, tagging, saving, or bookmarking one or more of the results. User interaction may also subsequent actions taken by the searcher, such as purchasing of the product based on the search. In some embodiments, the interaction data may include instances of user selection. User selection may refer to interaction between a searcher and the system that provide search results based on the search string provided by the searcher. From the results provided, the searcher may select one or more of the results for viewing, accessing, saving, bookmarking, or some other action the searcher may desire. For example, the searcher may view the results in generated user interfaces on the user device. The searcher may make a user selection by clicking, pressing, or otherwise select one or more of the results. The selection, or data generated by the selection, may be transmitted from the user device to the system. By way of examples, various searchers using devices 302 may view results of their search on devices 302. These various searchers may make selections from the results provided. These selections may be examples of user selection.

In some embodiments, the system may compile interaction data including user selection for a period of time. For example, each time a searcher performs a search using search strings, the system will keep record of the search stings as metric data, the results generated from the search strings, and the user selection of the results. Thus, over a period of time, the search metric data will contain among other data, what searchers searched for, what search strings are used, for each search string, what results were obtained and sent to the searchers and which of the results were selected.

In step 504, server 306 receives first attributes from CDS 308.

In some embodiments, the systems may retrieve, from the one or more databases, a plurality of first product identifiers associated with the interaction data. A product identifier may refer to data that uniquely identifies an entry stored in a database corresponding to a product. For example, a product identifier may include serial number, tag, stock keeping unit (SKU), name, code, and/or other identifying information. Various different data relating to the same product may be linked via the product identifier when stored in the database. In some embodiments, there may be multiple databases, each containing entries associated with a plurality of product identifier. First product identifiers may relate to entries stored in a first database, second product identifier may relate to entries stored in a second database, and so on. By way of example, as depicted in FIG. 3, the first product identifiers may be product identifiers received from search DB 304 as part of the interaction data, and second product identifier may be the product identifier received from vendor device 314.

In step 506, server 306 matches interaction data to the first product identifier.

In some embodiments, the first identifiers may be associated with interaction the based on user selection. For example, when searchers perform searches to locate database entries in system 100 corresponding to products, the results may be a listing of product identifiers of the database entries for the searcher to select. Thus, in an example of a search, a searcher uses search string to search for an entry in a database. The results of the search may include several entries, each of which has a corresponding product identifier. When the searcher selects one of these entries, the corresponding product identifier is thus associated with interaction data. When there are many searchers performing searches over a period of time, there may be repetition of search strings. For example, many different searchers may search for "Nike shoes white," "Samsung TV 50"," or other similar common search terms shoppers may use for product search. While the results generated from the same search strings would be the same, different searchers may select different results. For example, one searcher may search for "Nike shoes white" and selects product 11 (listed in FIG. 4) from among the results, while a second searcher may also search for "Nike shoes white" and selects product 435 (listed in FIG. 4). Thus, the system may generate a record of which search terms correspond to which product, and a frequency of a product being select from a search by a particular search term. This record may be stored as interaction data and be stored with other search metric data in a database (e.g. search DB 304).

In some embodiments, the plurality of first product identifiers may each have one or more first attributes. Attributes may refer to data that describes one or more properties of a product, such as its brand, use, dimension, weight, color, or any such data that may be relevant to some aspects of a product. For example, a laptop may include attributes such as screen size, weight, battery life, memory, processing speed, etc. In another example, a TV may include attributes such as type of display (plasma/LED/LCD), resolution, output interface, power consumption, etc. In yet another example, a toy of interlocking plastic bricks may include attributes such as number of pieces, material, suggested age of user, etc. In yet another example, a shoe may include attributes such as brand, color, style, etc. A person of ordinary skill in the art will appreciate that other examples of products belonging to different categories may include other type attributes. By of way of example, server 306 receives attributes associated with the first product identifiers from CDS DB 308.

In step 508, server 306 generates an interaction table.

In some embodiments, the systems may generate, based on the search metric data and the plurality of first product identifiers, a table, the table including the plurality of search strings ranked by the corresponding interaction data. As described previously, interaction data may include a frequency of a product being select from a search by a particular search string. A table may thus be generated containing a list of commonly used search strings. For each of the commonly search strings, the table may also include the number of times the search string is used and the commonly selected products associated and the frequencies of their selection. This list of commonly used search strings may be ranked based on the number of times the search strings are used.

In some embodiments, generating the table comprises formatting the plurality of search strings. Example of formatting may include copy, transfer, retrieve, format, truncate, sort, and/or otherwise manipulate search strings into appropriate format suitable for the systems in use. In some embodiments, generating the table includes removing undesired search strings from the plurality of search strings. Some search strings provided by searchers may be unneeded or inappropriate. For example, certain search strings may be unintelligible or may be provided in a language not supported by the systems (e.g. system 100), and thus these strings provide little value to the systems, and may be excluded from the table. In another example, certain search strings may contain vulgar or offensive language, and should be removed. A list of vulgar/offensive strings may be stored in one or more databases (e.g. CDS DB 308, or another separate database connected to system 100 not depicted), and search strings containing terms on the list may be removed.

In some embodiments, generating the table includes associating, based on the search metric data, each interaction of the plurality of search strings with one or more first product identifiers. In some embodiments, the interaction may be user selection as described previously. For example, each instance that searcher selects from the list of results based on a particular search string, the system associates the first product identifier of the selected result with that particular search string. The system may maintain counters to record a frequency of each product identifier (e.g., number times a product identifier is selected for that particular search string). By way of example depicted in FIG. 4, searchers selected product 11 for "Nike shoes white" 865 times; selected product 435 for "Nike shoes white" 34 times; selected product 11 for "Sport shoes" 76 times; and selected product 34 for "Samsung TV 50"" 652 times.

In some embodiments, generating the interaction table includes ranking, for each of the plurality of search strings, one or more first product identifiers. The product identifiers may be ranked, for example, by their respective frequency.

In step 510, server 306 generates lists from the interaction table.

In some embodiments, the systems may generate one or more relevant lists, the relevant lists comprise the plurality of search strings having corresponding interaction data above one or more threshold values. An example of a threshold value may be the total number of user selection for each of the plurality of search strings.

In some embodiments, the one or more relevant lists include a first relevant list and a second relevant list. In some embodiments, the first relevant list includes the plurality of search strings having corresponding interaction data above a first threshold value, and the second relevant list includes the plurality of search strings having corresponding interaction data above a second threshold value. In some embodiments, the first threshold value is greater than the second threshold value. In some embodiments, the first threshold and the second threshold may be a ranking of the search string in term of search frequency. For example, the top ranked search string is the topmost searched, the $1000^{th}$ ranked search string is the $10000^{th}$ most searched, and so on. In some embodiments, the first relevant list contains search strings that are top-query search strings (ranking between $1^{st}$ and $9999^{th}$), and the second relevant list contain torso-query search strings (ranking between $10000^{th}$ ranked and $79999^{th}$). In some embodiments, there may be a third relevant list, and may contain tail-query search strings (ranking between $80000^{th}$ and $180000^{th}$).

In some embodiments, generating the one or more relevant lists includes, populating a first relevant list with the first product identifiers having a ranking above a first threshold value. For example, from the table generated containing the plurality of search strings and their respective interaction data, each product identifiers may be ranked base on its frequency, from the most to the least. The first threshold may be a predetermined value of frequency. The second threshold value may be another predetermined value of frequency that is less than the first threshold value. Thus, the first relevant list will contain the first product identifiers having frequencies greater than or equal to the first threshold value. In some embodiments, generating the one or more relevant lists include populating a second relevant list with the first product identifiers having ranking above a second threshold value and below the first threshold value. The second relevant list will contain the first product identifiers having frequencies less than the first threshold value and greater than or equal to the second threshold values.

As described previously, each of the first product identifiers in the table is associated with one or more search strings, based on which of the first product identifiers are selected. Thus, the first relevant list and the second relevant list contain, for each of the first product identifiers in the respectively list, the associated search strings. For example, as depicted in FIG. 4, table 403 may be an example of the first or the second relevant list. Table 403 may include product 11 and product 34 because the corresponding frequencies for their search strings are either top-query search strings or torso-query search stings. Product 435 from table 401 may be excluded from table 403 because the because the corresponding search strings are neither top-query search strings nor torso query search strings.

In step 512, server 306 stores the lists in inverted format.

In some embodiments, generating the one or more relevant lists include storing the first relevant list and the second relevant list in an inverted index format. Inverted index format may refer to methods or algorithms for indexing files and data for storage in databases that allow for quick and efficient retrieval by an inverted index search engine. An inverted index/search may refer to methods or algorithms for searching and indexing data in databases where individual terms are indexed and directed to its location/or entry, in contrast to a forward index/search where locations/entries of the terms are indexed and directed to the terms.

Figure 6:
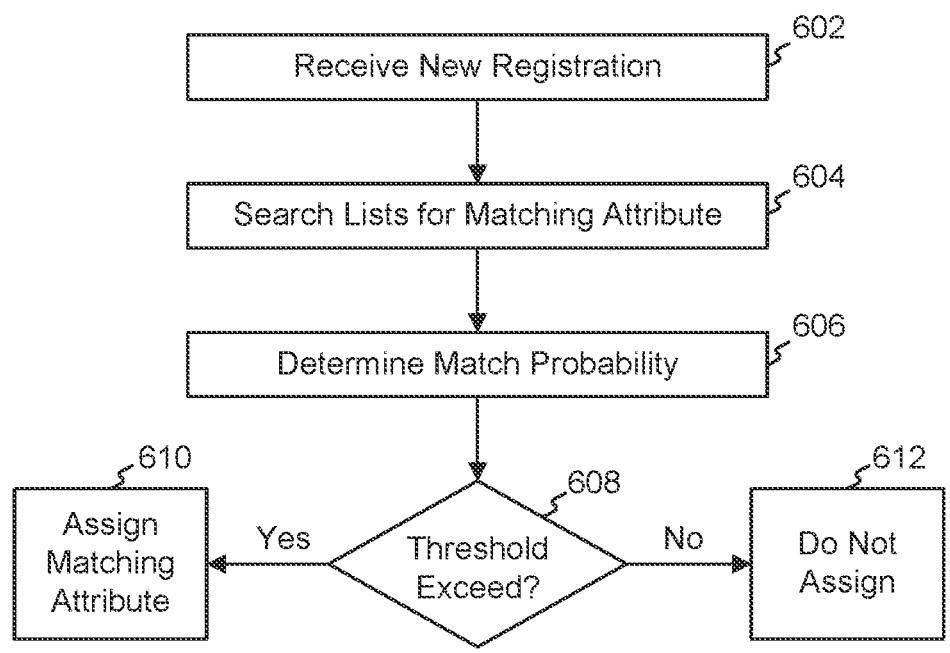
FIG. 6 is a flow chart depicting an exemplary process for generating keywords for searches consistent with the disclosed embodiments.

FIG. 6 is a flow chart depicting an exemplary process for generating keywords for searches consistent with the disclosed embodiments.

In step 602, server 306 receives new product registration.

In some embodiments, step 602 comprises retrieving data relating to a second product identifier. Second product identifiers may refer to product identifiers that server 306 retrieves from databases or source different from that of the first product identifiers. By way of example, as illustrated in FIG. 3, server 306 receives the second product identifier from vendor device 314. In some instances, as part of registering new product, server 306 may also receive data relating to the second identifier from vendor device 314. In some embodiments, the server 306 may extract, from the data relating to a second product identifier, one or more second attribute data of the second product identifier. The second attributes may be information relating to properties associated with a product identified by the second product identifier, similar to the first attributes. In some embodiments, the second attributes may be product name keywords, tags, or other text strings associated with the second product identifier. In some embodiments, the second product may lack product information, and the second contributes may consist of only the product name. By way of example, server 306 may receive the second attributes along with the second identifier from vendor device 314.

In some embodiments, the first product identifiers represent existing products that have already been processed by the system, and already deemed to possess keywords, tags, attributes, and other similar text searchable strings that enable them to be readily locatable in a database. The second product identifier may represent a new product that is being registered into the systems' (e.g. system 100) database.

In step 604, server 306 searches lists for matching attributes.

In some embodiments, server 306 may perform searches in the relevant lists using the one or more second attribute data. In some embodiments, performing searches includes generating one or more search terms based on the second attribute data of the second product identifier. For example, server 306 may generate a search term based on the product name of the second product identifier.

In some embodiments, performing searches includes performing inverted index searches based on the search terms for matches in the first attributes of the first product identifiers stored the first relevant list and the second relevant list. As discussed above, each of the first product identifiers are associated with one or more first attributes. Systems may perform inverted index search through the first relevant list and/or the second relevant list for first attributes of first product identifiers on those lists. In some embodiments, when the search terms consist of a product name of the second product identifier, server 306 performs inverted index searches for the product name of the first product identifiers on the first and/or second relevant lists.

In step 606, server 306 determine match ranking.

In some embodiments, step 606 includes assigning, based on a predetermined rule, keywords to the data relating to the second identifier, the keywords being one or more of the plurality of search strings. A predetermined rule may be an algorithm or logic, executed by server 306, for determining whether assigning the keywords is appropriate. Once server 306 determine that assigning the keywords is appropriate, server 306 will assign one or more of the plurality of search strings as keywords to the second identifier.

In some embodiments, the predetermined rule may include determining, for each of the identified first product identifiers, a rank of matching, the rank of matching being based on a number of the searching terms that matches the first attributes. A higher number of matches may indicate a higher ranking. For example, the first product identifiers that have product names that are more similar to the product name of the second product identifier are ranked higher.

FIG. 7 depicts an illustrated exemplary process for determining a ranking of matching, consistent with the disclosed embodiments. For examples, in step 602, a vendor registers a new shoe product having the product name of "Nike Air Max fly sneaker M AT2506-100." In some embodiments, search terms may be formed from a combination of terms from the product name. In the example depicted in FIG. 7, one of the first or second lists that may contain first product identifiers having names of "Nike AIR MAX 97 triple white sneakers," "Nike Phantom Football," "Nike Court Royal SL sneakers," and "Nike Air Max 270 White University." In step 604, server 306 performs an inverted index search for first product identifiers having product names matching the product names of the second product identifier. As depicted in the example of FIG. 7, the result of the search is ranked based a likelihood of match of the product names. Column 702 is the rank of matching, rank 1 being the most likely matched. Column 704 represents the first product identifiers. Column 706 includes the keywords corresponding to each of the first product identifier firers in column 704. Column 708 includes the frequency corresponding to the keywords in column 706.

Referring back to FIG. 6, in step 608, server 306 determine whether a threshold value is exceeded.

In some embodiments, the predetermined rule may include determining a relevancy status for each of the identified first product identifiers based on the ranking of matching, the frequency of a corresponding keyword, a threshold ranking of matching and a threshold frequency.

The relevancy status may be a decision by server 306 on whether to assign a key term to the second product identifier. Recall from previous discussion that the keywords may be search strings provided by devices 302. As part of the interaction data, every search string may be ranked by the frequency of use into categories of top-query, torso-query, and/or tail-query. Search strings are these categories are separated into the first relevant list, the second relevant list, and the third relevant list. A person of ordinary skill in the art will appreciate that the particular specific ranking position of the first rank and the second rank may be adjusted as needed.

In some embodiments, the thresholds for assigning keywords in the first relevant list may be a maximum rank of 4 and a minimum frequency of 13. Maximum rank refers to the ranking with respect to column 702, and minimum frequency refers to numbers click with respect to column 704. For keywords in the second relevant list, the thresholds may be a maximum rank of 1 and a minimum frequency of 4. For keywords in the third relevant list, the thresholds may be a maximum rank of 3 and minimum frequency of 60. A person of ordinary skill in the art will understand that the rank and frequency number may be adjusted as needed as to include the desired products in the appropriate list.

For example, if the keyword "Nike football" is included in the first relevant list, then server 306 will assign it to the new product, since its rank in column 702 is 2 (less than maximum rank of 4), and it has 139 clicks (greater than 4). If, however, "Nike football" is included in the second relevant list, then server 306 will not assign it to the new product, since its rank column is 2 (greater than maximum rank of 1).

Referring back to FIG. 6, if determination is 'No' in step 608, in step 612, server 306 does not assign keywords to the new product registered in step 612. If determination is 'Yes' in step 608, in step 610, server 306 assign keywords to the new product registered in step 602. For example, in the example depicted, if server 306 determines "Yes" in step 608 for the keyword "Nike football", the new product will be assigned "Nike football", so that any this new product may be found during searches or be promoted by the on-line retail system when "Nike football" is searched by a user.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method of generating keywords for searches, comprising:
   retrieving, from one or more databases, search metric data for a predetermined time period, the search metric data comprising strings, and interaction data corresponding to each of the strings;
   retrieving, from the one or more databases, a plurality of first product identifiers associated with the interaction data, the plurality of first product identifiers each having one or more first attributes;
   generating, based on the search metric data and the plurality of first product identifiers, a table comprising the strings ranked by the corresponding interaction data;
   generating one or more lists comprising the strings having corresponding interaction data above one or more threshold values;
   retrieving data relating to a second product identifier;
   performing at least one search in the one or more lists based on the second product identifier;
   assigning keywords to the data relating to the second identifier, the keywords being one or more of the strings.

2. The method of claim 1, wherein the strings are provided from one or more user devices.

3. The method of claim 1, wherein the interaction data comprises user interaction data with search results of each of the strings.

4. The method of claim 1, wherein the interaction data comprises instances of user selection.

5. The method of claim 1, wherein the one or more lists comprise strings having corresponding interaction data above a threshold value.

6. The method of claim 1, wherein generating the table comprises:
   formatting the strings;
   removing undesired strings;
   associating, based on the search metric data, each interaction of the strings with one or more first product identifiers; and
   ranking one or more first product identifiers.

7. The method of claim 1, wherein generating one or more lists comprises:
   populating one or more lists with first product identifiers having rankings above a threshold value;
   storing the one or more lists in an inverted index format.

8. The method of claim 7, wherein performing at least one search in one or more lists based on the second product identifier comprises:
- generating one or more search terms based on the second product identifier;
- performing inverted index searches based on the search terms for matches in the first product identifiers;
- identifying the first product identifiers associated with the results of the inverted index searches.

9. The method of claim 8, wherein assigning the keywords comprises:
- determining, for each of the identified first product identifiers, a probability of matching, the probability of matching being based on a number of the searching terms matching the first product identifier;
- determining, for each of the first identified product identifiers, based on the associated interaction data, a frequency; and
- determining a relevancy status for each of the identified first product identifiers based on the probability of matching, the frequency, a threshold probability of matching and a threshold frequency; and
- updating the data of the second product identifier to include the strings associated with the first identified product identifiers based on the relevancy status.

10. The method of claim 9, wherein the first identified product identifiers have different values of the threshold probability of matching and the threshold frequency than the first identified product identifiers contained in another list.

11. A system for generating keywords for searches, comprising:
- one or more databases;
- one or more storage media storing computer readable instructions; and
- at least one processor configured to execute the stored instructions to perform the step of:
  - retrieving, from one or more databases, search metric data for a predetermined time period, the search metric data comprising strings, and interaction data corresponding to each of the strings;
  - retrieving, from the one or more databases, a plurality of first product identifiers associated with the interaction data, the plurality of first product identifiers each having one or more first attributes;
  - generating, based on the search metric data and the plurality of first product identifiers, a table comprising the strings ranked by the corresponding interaction data;
  - generating one or more lists comprising the strings having corresponding interaction data above one or more threshold values;
  - retrieving data relating to a second product identifier;
  - performing at least one search in the one or more lists based on the second product identifier;
  - assigning keywords to the data relating to the second identifier, the keywords being one or more of the strings.

12. The system of claim 11, wherein the strings are provided from one or more user devices.

13. The system of claim 11, wherein the interaction data comprises user interaction data with search results of each of the strings.

14. The system of claim 11, wherein the interaction data comprises instances of user selection.

15. The system of claim 11, wherein the one or more lists comprise strings having corresponding interaction data above a threshold value.

16. The system of claim 11, wherein generating the table comprises:
- formatting the strings;
- removing undesired strings;
- associating, based on the search metric data, each interaction of the strings with one or more first product identifiers; and
- ranking one or more first product identifiers.

17. The system of claim 11, wherein generating one or more lists comprises:
- populating one or more lists with first product identifiers having rankings above a threshold value;
- storing the one or more lists in an inverted index format.

18. The system of claim 17, wherein performing at least one search in one or more lists based on the second product identifier comprises:
- generating one or more search terms based on the second product identifier;
- performing inverted index searches based on the search terms for matches in the first product identifiers;
- identifying the first product identifiers associated with the results of the inverted index searches.

19. The system of claim 18, wherein assigning the keywords comprises:
- determining, for each of the identified first product identifiers, a probability of matching, the probability of matching being based on a number of the searching terms matching the first product identifier;
- determining, for each of the first identified product identifiers, based on the associated interaction data, a frequency; and
- determining a relevancy status for each of the identified first product identifiers based on the probability of matching, the frequency, a threshold probability of matching and a threshold frequency; and
- updating the data of the second product identifier to include the strings associated with the first identified product identifiers based on the relevancy status.

20. The system of claim 19, wherein the first identified product identifiers have different values of the threshold probability of matching and the threshold frequency than the first identified product identifiers contained in another list.

* * * * *